(12) United States Patent
Delajoud et al.

(10) Patent No.: US 7,958,768 B2
(45) Date of Patent: Jun. 14, 2011

(54) SYSTEM TO CONTROL PRESSURE IN A TEST DEVICE

(75) Inventors: Pierre R. Delajoud, Neuilly sur Seine (FR); Robert B. Haines, Phoenix, AZ (US); Thomas A. Lohkamp, Phoenix, AZ (US)

(73) Assignee: Fluke Corporation, Everett, WA (US)

( * ) Notice: Subject to any disclaimer, the term of this patent is extended or adjusted under 35 U.S.C. 154(b) by 450 days.

(21) Appl. No.: 12/145,193

(22) Filed: Jun. 24, 2008

(65) Prior Publication Data

US 2009/0314055 A1    Dec. 24, 2009

(51) Int. Cl.
*G01L 27/00*   (2006.01)
*G05D 16/18*   (2006.01)
*G05D 16/02*   (2006.01)
*F16K 31/126*  (2006.01)
*F16K 39/00*   (2006.01)

(52) U.S. Cl. .......... 73/1.57; 73/1.66; 73/1.72; 137/505; 137/596.12; 137/596.13; 137/597

(58) Field of Classification Search .................. None
See application file for complete search history.

(56) References Cited

U.S. PATENT DOCUMENTS

| | | | | |
|---|---|---|---|---|
| 3,132,659 A * | 5/1964 | Kenyon | ............. | 137/39 |
| 3,527,105 A * | 9/1970 | Weisbord et al. | ............. | 73/514.11 |
| 3,705,595 A * | 12/1972 | Laakaniemi et al. | ............. | 137/824 |
| 3,753,552 A * | 8/1973 | Barron | ............. | 254/270 |
| 3,788,351 A * | 1/1974 | Conklin, Jr. | ............. | 137/512.1 |
| 4,420,014 A * | 12/1983 | Riggs et al. | ............. | 137/468 |
| 4,602,606 A * | 7/1986 | Kawagoe et al. | ............. | 123/568.22 |
| 4,627,459 A * | 12/1986 | Gulko | ............. | 137/116.5 |
| 4,836,234 A * | 6/1989 | Hicks | ............. | 137/596.17 |
| 5,142,483 A | 8/1992 | Basham et al. | | |
| 5,358,315 A * | 10/1994 | Balukin | ............. | 303/15 |
| 5,579,244 A | 11/1996 | Brown | | |
| 6,474,318 B1 * | 11/2002 | Jones et al. | ............. | 123/564 |
| 7,429,358 B1 * | 9/2008 | Gross | ............. | 422/83 |
| 2008/0256943 A1* | 10/2008 | Shimizu et al. | ............. | 60/459 |

FOREIGN PATENT DOCUMENTS

| | | | |
|---|---|---|---|
| EP | 301745 B1 * | 1/1995 | |
| GB | 1355659 A * | 6/1974 | |
| JP | 09114527 A * | 5/1997 | |

* cited by examiner

*Primary Examiner* — Thomas P Noland
(74) *Attorney, Agent, or Firm* — Christensen O'Connor Johnston Kindness PLLC

(57) ABSTRACT

Embodiments of the present invention are directed toward pressure controllers and calibrators for setting or measuring pressures in test devices. In one embodiment, the pressure controller contains a dual reference pressure controller. The dual reference pressure controller is operable to maintain two different pressures relative to a reference pressure. The first pressure being a relatively fixed amount greater than the reference pressure and the second pressure being a relatively fixed amount less than the reference pressure.

23 Claims, 7 Drawing Sheets

SYSTEM TO CONTROL PRESSURE IN A TEST DEVICE

TECHNICAL FIELD

This invention is directed to a system to set pressures in a device, and more particularly, to pressure controllers and calibrators operable to set pressures in devices, such as test devices, manifolds, and volumes.

BACKGROUND OF THE INVENTION

Pressure controllers/calibrators set and/or measure pressures in components, such as test devices, manifolds, and volumes. A typical prior art pressure controller/calibrator 100 used to set and measure the pressure of a gas in a test device is shown in FIG. 1. In particular, FIG. 1 shows a test volume 102 having an inlet port 112, an outlet port 142, and a test port 170. The inlet port 112 is connected to an inlet valve 111, which is connected to a supply pressure (not shown) through a supply port 110. The outlet port 142 is connected to an outlet valve 141, which is connected to an exhaust pressure (not shown) through an exhaust port 140. The supply pressure supplies pressure to the test volume 102, and the exhaust pressure removes pressure from the test volume 102. To increase pressure to the test volume 102, the inlet valve 111 may be opened, and to decrease pressure to from the test volume 102, the outlet valve 141 may be opened. However, to achieve small increases in pressure within the test volume 102, often the inlet valve 111 is pulse width modulated at varying widths and the outlet valve 141 is pulsed at a fixed width and rate. Conversely, to achieve small decreases in pressure within the test volume 102 the outlet valve 141 is pulsed width modulated at varying widths and the inlet valve 111 is pulsed at a fixed width and rate. The test port 170 is connected to a device under test (not shown). In addition, the test port 170 may be connected to a transducer and electronics (not shown) that drive the inlet and outlet valves 111, 141.

The supply pressure is typically greater than the highest pressure to be controlled in the test volume 102. For instance, the supply pressure may be ten percent greater than the pressure to be controlled in the test volume 102. The outlet valve 141 is connected to an exhaust pressure having a lower pressure than the test volume 102 through the exhaust port 140, which releases pressure from the test volume102. Typically, the exhaust pressure is atmosphere or a vacuum.

As stated above, the pressure in the test volume 102 is set by controlling the opening and closing of the inlet valve 111 and the outlet valve 141. Therefore, the differential pressure across the inlet valve 111, referred herein as inlet differential pressure, varies depending on the supply pressure and the test pressure within the test volume 102. Similarly, the differential pressure across the outlet valve 141, referred herein as outlet differential pressure, varies depending on the exhaust pressure and the test pressure in the test volume 102. In some instances, such as for high test volume pressures, the inlet differential pressure and the outlet differential pressure can deviate by three orders of magnitude or more throughout the controlled pressure range of the test volume 102.

High differential pressures require a large force to open the valves 111, 141. As a result, valves used in these pressure controllers are typically very large, consume excessive power, and often exhibit a slow response time. In addition, due to the large differential pressure across each valve 111, 141, the control precision of the valves 111, 141 are limited, thus providing a reduction in the stability of the pressure supplied to test volume 102. Furthermore, for the valves 111, 141 to produce bubble tight seals, valve poppets are typically manufactured from a soft elastomer that conforms to the seat. However, the combination of soft materials and high fluid velocities discussed above often results in premature wear of the valve poppets.

More recently, pressure controllers/calibrators comprising differential pressure regulators have been used to reduce the differential pressure applied to the inlet and outlet valves. FIG. 2 shows a pressure controller/calibrator 200 that includes such a configuration. The pressure controller 200 includes a test volume 202, a supply port 210, an inlet port 212, a test port 270, an outlet port 242, and an exhaust port 240 similar to those shown in FIG. 1. The pressure controller 200 of FIG. 2 differs from that in FIG. 1 by having a supply differential pressure regulator 201 placed between the inlet valve 211 and the supply port 210, and an exhaust differential pressure regulator 241 placed between the outlet valve 241 and the exhaust port 240. Between the supply regulator 201 and the inlet valve 211 is a high port 214, and between the exhaust regulator 241 and the outlet valve 241 is a low port 244. A supply feedback path 272 connects the test volume 202 with the supply regulator 201. Similarly, an exhaust feedback path 274 connects the test volume 202 with the exhaust regulator 241. The supply and exhaust feedback paths 272, 274 provide feedback regarding the pressure in the test volume 202.

The supply and exhaust differential regulators 201, 241 provide a low and relatively constant differential pressure across the inlet and outlet valves 211, 241, respectively. For instance, the supply differential pressure across the inlet valve 211 is the difference in pressure between the high port 214 and the inlet port 212. Similarly, the exhaust differential pressure across the outlet valve 241 is the difference in pressure between the low port 244 and the outlet port 242. These fixed, low differential pressures across the valves 211, 241 results in lower, more consistent flow rates through the valves 211, 241. Thus, improving the stability of the differential pressure across the control valves enhances the control precision of the system over the prior art shown in FIG. 1.

Pressure drop across the supply regulator 201 and the exhaust regulator 241 are typically large. For instance, the pressure at the supply port 210 is typically much higher than the pressure at the high port 214 and the pressure at the exhaust port 240 is typically much lower than the pressure at the low port 244. However, because regulators 201 and 241 are not directly responsible for the control precision in the test volume 202, they may be constructed more robustly to withstand the effects of higher supply and exhaust pressures. For instance, the regulators 201, 241 utilize metal on metal seats (not shown), which are more resistant to wear than the soft elastomer seats used in the prior art. However, the metal on metal seals result in some leakage. Therefore, a bypass path 280 that connects the high port 214 with the low port 244 is provided to prevent build up of pressure at the high port 214. The bypass path 280 includes a restriction 282 to limit the flow through the bypass path 280. The conductance of the bypass restriction 282 is sized to tolerate some leakage through the metal to metal seals. Because flow through the bypass 282 wastes supply fluid, leakage through seats 222 and 253 of prior art should be minimized.

Differential regulators of current art, like the regulators 201 and 241 shown in FIG. 2, are not capable of withstanding higher pressures, such as pressures greater than 10 MPa, without increasing wall thicknesses and screw sizes. Such modifications would make the regulators excessively heavy, large and expensive. In particular, because each diaphragm is held together between two flanges secured by screws, the clamping of the screws limits the maximum pressure the regulators can withstand. Above 10 MPa the regulators 201, 241 leak to atmospheric pressure on both sides of the diaphragm, thwarting the ability of the system to maintain a stable test pressure.

Diaphragms within differential regulators of prior art, like the diaphragms 280 and 285 shown in FIG. 2, are susceptible to damage caused by inadvertent overpressure events. For example, if supply pressure is inadvertently removed from the supply port 210 while high pressure is contained in the test volume 202, fluid will leak through the metal to metal seal of seat 253 and out the exhaust port 240. This leaves high pressure above the diaphragms 280 and 285 with low pressure below the diaphragms. This high differential pressure leads to damage of seat 253 and rupture of diaphragms 280 and 285.

Therefore, there is a need for a regulator that can operate at high pressures without requiring the regulator to become too bulky and heavy, and provides protection for the diaphragm and seats, reduces the amount of gas lost through the bypass path, and prevents leaks to atmosphere and within the system.

SUMMARY OF THE INVENTION

This invention relates generally to a system of accurately setting pressures in a test device, and more specifically to pressure controllers operable to set pressures in a test device and/or pressure calibrators operable to measure pressures in test device. One aspect of the invention includes a pressure regulator comprising a housing, where the housing has a first port configured to receive a supply pressure, a second port configured to output an exhaust pressure, a third port selectively coupled to the first port and configured to output a third pressure, a fourth port selectively coupled to the second port and configured to input a fourth pressure, and a fifth port configured to receive a reference pressure, where each pressure is different from each other.

Another aspect of the invention includes a dual differential pressure regulator comprising a housing and a reference port that is coupled to the housing and operable to receive a reference pressure. A supply port is coupled to the housing and operable to receive a supply pressure, and a high port is coupled to the housing and operable to provide an output pressure. The high port is further coupled to a supply valve operable to place the high port in selective fluid communication with the supply port, the output pressure of the high port being a relatively fixed amount greater than the test volume pressure. The regulator further comprising an exhaust port that is coupled to the housing and operable to be connected to an exhaust pressure. The regulator also comprising a low port coupled to the housing and operable to receive an input pressure, the low port coupled to an exhaust valve operable to place the low port in selective fluid communication with the exhaust port, where the input pressure of the low port is a relatively fixed amount less than the test volume pressure.

DETAILED DESCRIPTION OF PREFERRED EMBODIMENTS

Embodiments of the present invention are directed toward a method and system of setting and measuring pressures in devices, in particular one or more embodiments are directed to pressure controllers and calibrators operable to set and/or measure pressures in devices, such as a device under test. Certain details are set forth below to provide a sufficient understanding of the embodiments of the invention. However, it will be clear to one skilled in the art that various embodiments of the invention may be practiced without these particular details.

Figure 2:
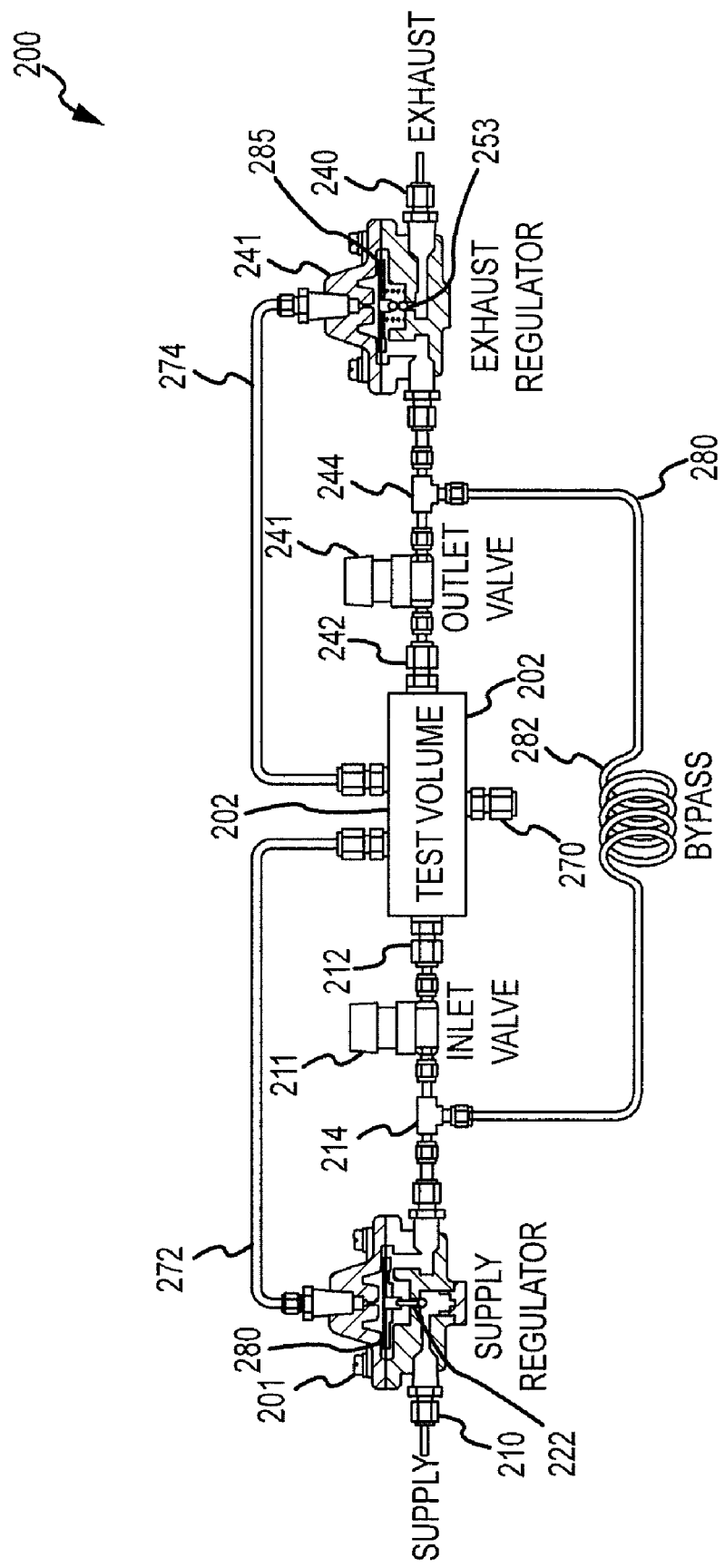
FIG. 2 is a schematic illustration of a pressure controller utilizing a supply regulator and an exhaust regulator in accordance with the prior art.
Figure 3:
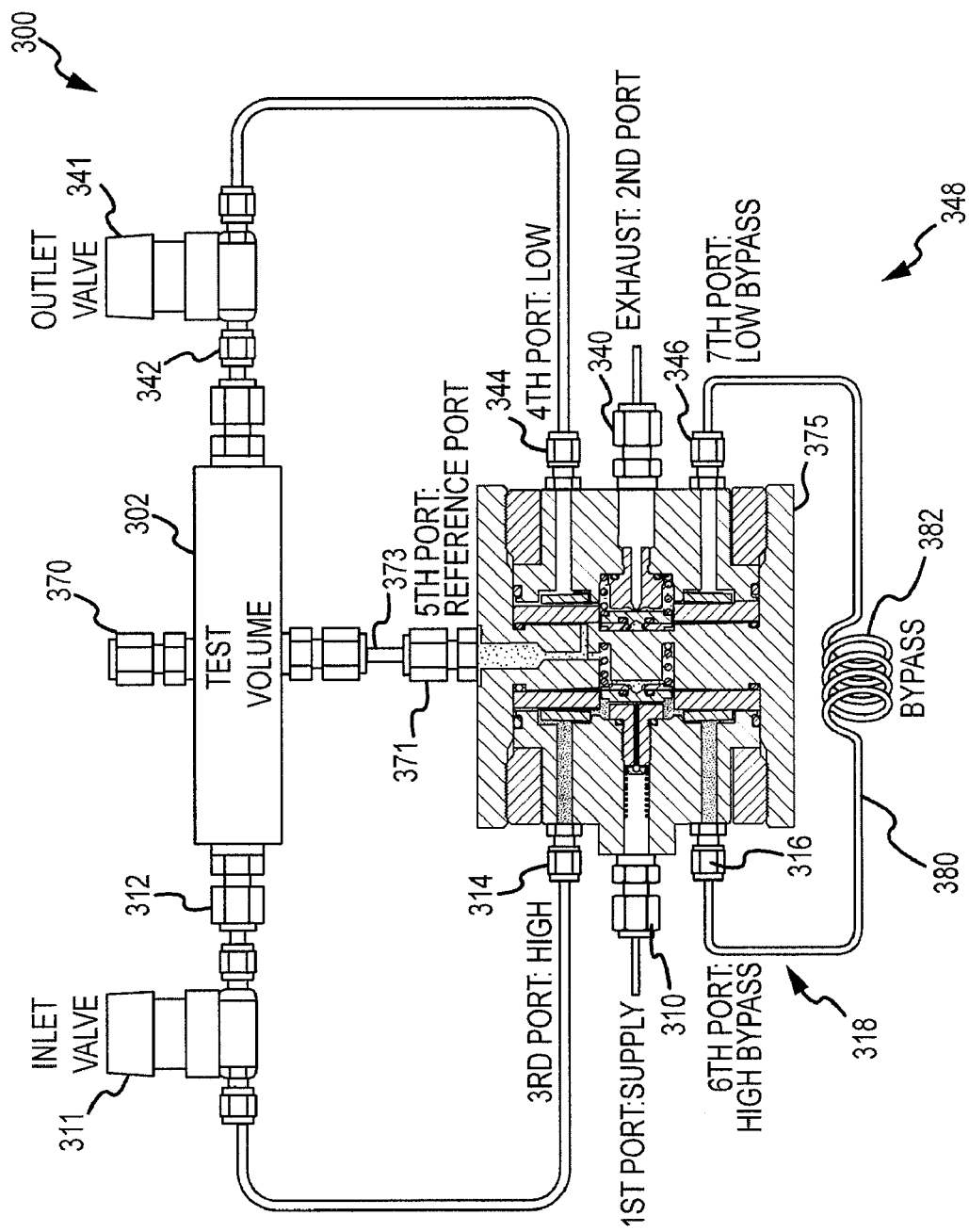
FIG. 3 is a schematic illustration of a pressure controller utilizing a dual differential pressure regulator according to an embodiment of the invention.

FIG. 3 is a schematic illustration of a pressure controller/calibrator 300 utilizing a dual differential pressure regulator 375 according to an embodiment of the invention. The pressure controller/calibrator 300 in FIG. 3 differs from the pressure controller/calibrator 200 in FIG. 2 in that it includes one dual differential pressure regulator 375 rather than the two differential pressure regulators 201, 241. The pressure controller/calibrator 300 includes a supply port 310, an exhaust port 340, a high port 314, a low port 344, an inlet valve 311, an outlet valve 341, an inlet port 312, an outlet port 342, a test volume 302, and a test port 370 similar to those described in reference to FIG. 2 and will not be described again here in the interest of brevity. The pressure controller 300, however, includes only one feedback path 373 that provides feedback regarding the pressure in the test volume 302. The feedback path 373 is connected to the dual differential pressure regulator 375 through a reference port 371. As in the prior art, the test port 370 is connected to a device under test (not shown) and typically connected to a transducer and electronics (not shown) for driving valves 311, 341.

The inlet differential pressure across the inlet valve 311 is maintained by a supply end 318 of the regulator 375. The outlet differential pressure across the outlet valve 346 is maintained by an exhaust end 348 of the regulator 375. Pressure control of the test volume 302 is accomplished by the methods described in the prior art. For instance, pressure control may be accomplished by opening or pulsing the inlet and outlet valves 311, 341 independently or in combination. In addition, one valve may be pulsed at varying widths while the other is pulsed as a fixed width.

Figure 1:
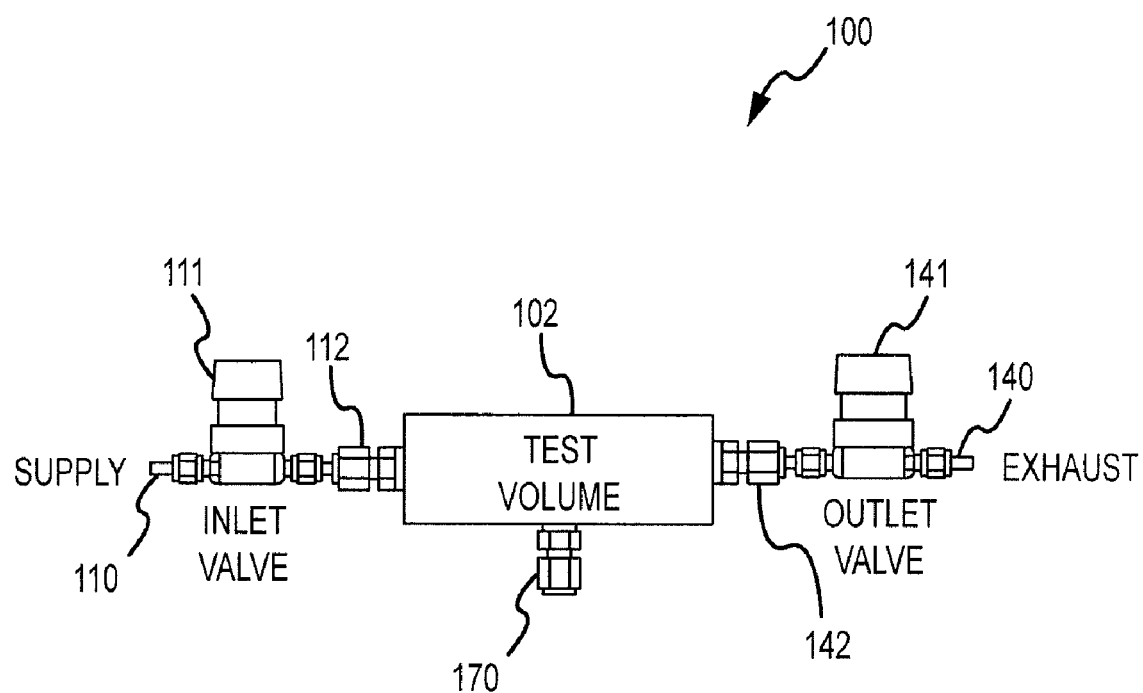
FIG. 1 is a schematic illustration of a pressure controller in accordance with prior art.
Figure 4:
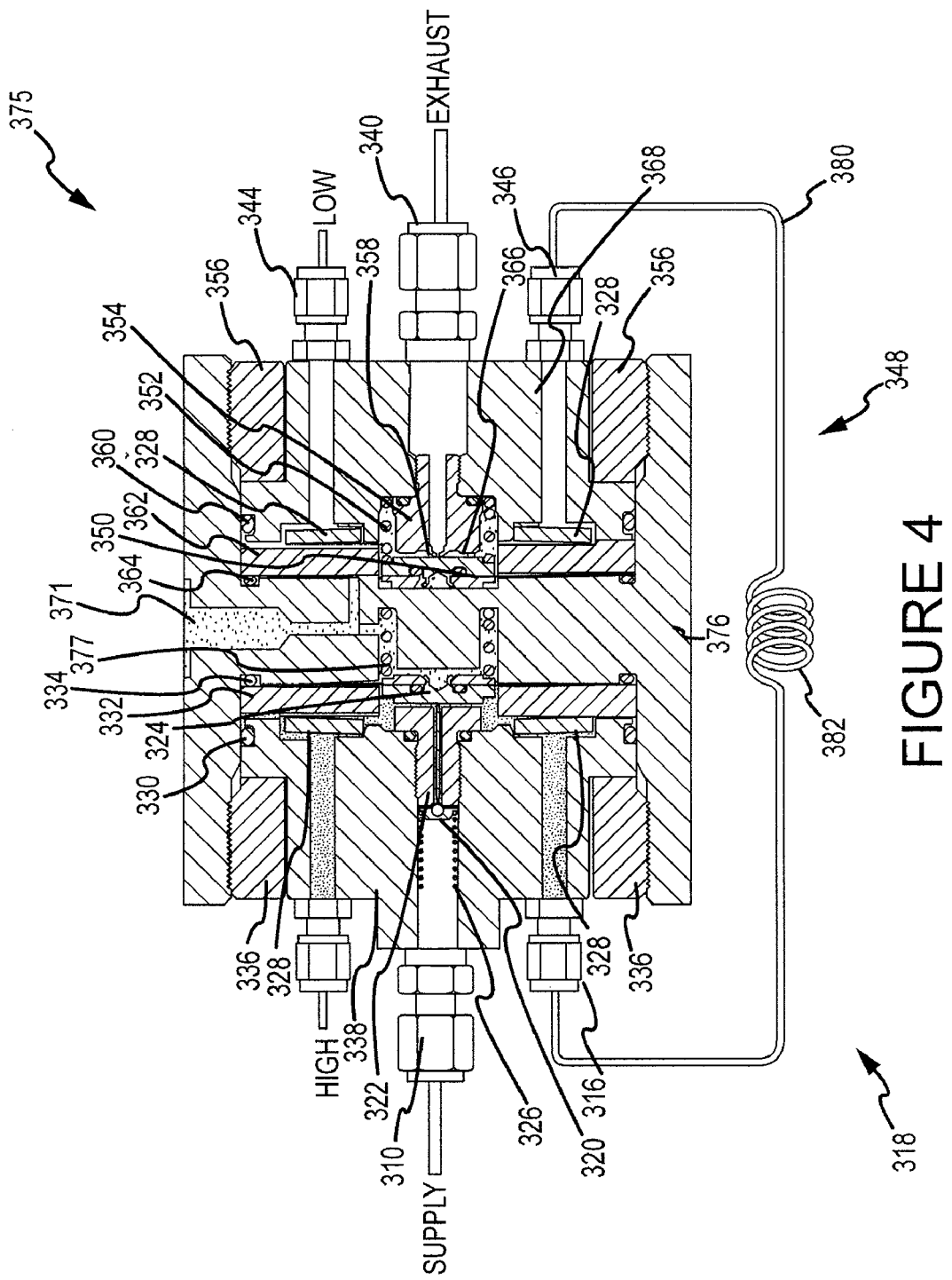
FIG. 4 is a schematic illustration of a dual differential pressure regulator according to an embodiment of the invention.

FIG. 4 is a schematic illustration of a dual differential pressure regulator 375 according to one embodiment of the invention. The dual differential pressure regulator 375 of FIG. 4 has the same components as those described in reference to FIG. 3 and will not be repeated in the interest of brevity. The supply end 318 of the regulator 375 supplies fluid, such as gas, to the test volume 302 of FIG. 3. FIG. 4 will be discussed in reference to a gas, but as will be clear to a person of ordinary skill in the art, any type of fluid may be used. As stated above, an inlet differential pressure is created across the inlet valve 311 at the high port 314 and the inlet port 312. Similarly, an outlet differential pressure is created across the outlet valve 341 at the low port 344 and the outlet port 342. As seen in the prior art regulators in FIG. 2, the inlet and outlet differential pressures across the valves 211, 241 remain low and relatively constant compared to the differential pressures across the valves 111, 141 of FIG. 1. In particular, the pressure at the high port 314 is maintained at a fixed amount greater than the test volume pressure, and the pressure at the low port 344 is maintained at a fixed amount less than the test volume pressure.

The dual pressure regulator 375 also includes a bypass path 380. The bypass path 380 is connected to the regulator 375 through a high bypass port 316 and a low bypass port 346. As in the pressure controller 200 in FIG. 2, the bypass path 380 includes a restriction 382, where the flow defined by the restriction is larger than the leakage provided through the supply seat 322. In some cases, the flow is approximately one order of magnitude greater. Therefore, there is a substantial need for a supply seat design that minimizes leakage through the supply seat 322.

Gas is supplied to the test volume 302 of FIG. 3 through the supply end 318 of the regulator 375. The supply end 318 of the regulator 375 includes a supply spring 326, a needle assembly 320, a supply seat 322 and a supply diaphragm assembly 324. In one embodiment, the supply diaphragm is a single unitary body. In another embodiment, the supply diaphragm assembly 324 comprises a thin diaphragm member 380, a hub 381, a washer 382 and a seal 383. The hub 381 has a rivet that is used to hold the diaphragm assembly 324 together.

Figure 7:
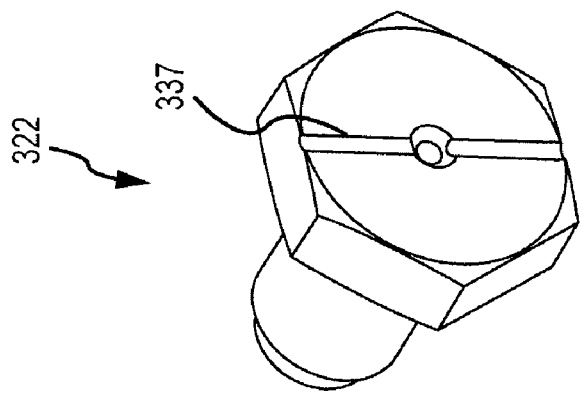
FIG. 7 is a 3-D view of the supply seat on the supply end of the dual differential pressure regulator of FIG. 6.
Figure 6:
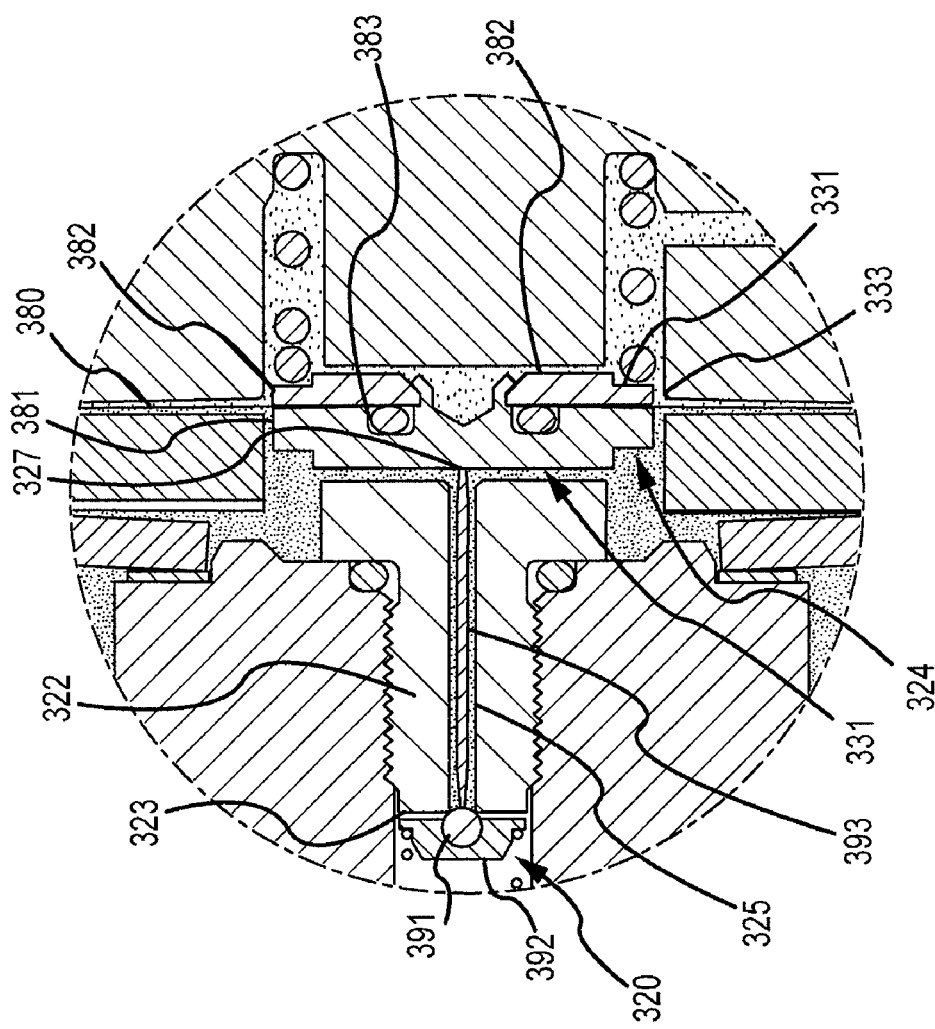
FIG. 6 is a schematic illustration of the supply end of the dual differential pressure regulator of FIG. 4 according to an embodiment of the invention.

FIG. 6 provides a close up of the supply end 318 of the regulator 375 of FIG. 4. In reference to both FIG. 4 and FIG. 6, the needle assembly 320 comprises a ball 391, ball carrier 392, and pin 393. In one embodiment, each component of the needle assembly 320 are separate individual parts. The supply seat 322 has an opening 325 that the pin 393 is provided through so that a tip 327 of the pin 393 contacts a first surface 331 of the supply diaphragm assembly 324. The ball 391 is designed so that a portion of the ball 391 contacts an end 323 of the seat 322 opening 325. The contact between the ball 391 and the opening 325 creates a reliable seal and significantly reduces leaks through the supply seat 322. In another embodiment, the needle assembly 320 may be one integral piece comprising a pin with a conical shaped end (not shown) that creates a seal at the end 323 of the seat opening 322. In one embodiment, the length of the pin 393 and the opening 325 in the supply seat 322 are long relative to their widths. FIG. 7 is a 3-D view of the supply seat on the supply end of the dual differential pressure regulator of FIG. 6. Slot 337 in supply seat 322 provides a path for the inlet flow.

Figure 5:
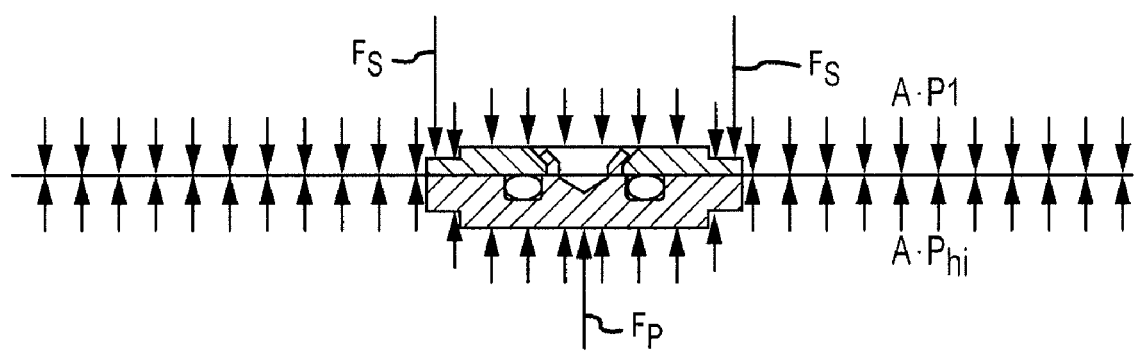
FIG. 5 is a freebody diagram of a diaphragm assembly in a dual differential pressure regulator according to an embodiment of the invention.

When the regulator 375 is not pressurized, i.e. no supply pressure or reference pressure being applied to the regulator, the supply seat 322 is open under the effect of the force applied to the second surface 333 of the supply diaphragm assembly 324 due to a reference spring 377. Conversely, when a supply pressure and reference pressure are present (the regulator is pressurized), the supply seat 322 is nearly closed but maintains a small leak flow rate that is nominally equal to the bypass 380 flow rate. As will be explained in more detail below, when the regulator is pressured, the supply end 318 of the regulator 375 is typically in equilibrium and maintains a supply differential pressure defined by the reference spring 377 force. Thus, the reference spring 377 force is generally equal to the differential pressure across the supply diaphragm assembly 324 times the area of the supply diaphragm assembly 324. FIG. 5 is a free body diagram showing the forces applied to the supply diaphragm assembly 324 when the regulator 375 is pressurized. A description of all of the forces applied to the supply diaphragm assembly are below:

$F_s$ Force exerted on the supply diaphragm assembly 324 by the reference spring 377

$F_p$ Force exerted on the supply diaphragm assembly 324 by the pin 393

$P_{hi}$ Pressure provided by the supply end 318 of the regulator 375

$P_t$ Pressure in the test volume 302

$A$ Area of the supply diaphragm assembly 324

The supply diaphragm assembly 324 is in equilibrium, therefore, the forces on the diaphragm assembly 324 must sum to zero. This can be written as:

$$\Sigma F : AP_{hi} + F_p - F_s - AP_t = 0$$

Solving for $P_{hi}$ provides $$P_{hi} = P_t + \frac{F_s - F_p}{A}$$

Compared to the force exerted by the reference spring 377, the force exerted by the pin 393 is small. Approximating this smaller force as zero provides the following expression for differential pressure provided by the regulator.

$$P_{hi} - P_t = \Delta P_{hi} = \frac{F_s}{A}$$

Therefore, the inlet differential pressure is approximately equal to the reference spring 377 force divided by the area of the supply diaphragm assembly 324. Therefore, higher inlet differential pressures require a higher reference spring 377 force. When the supply diaphragm assembly 324 is no longer in equilibrium, the reference spring 377 force opens the supply seat 322 until the supply diaphragm assembly is in equilibrium again. More particularly, gas passes between the needle assembly 320 and the seat 322 and fills the space in the supply end 318 of the regulator. When the supply diaphragm assembly 324 reaches equilibrium again, the supply diaphragm assembly 324 compresses the reference spring 377 and the supply seat 322 closes.

Figure 8:
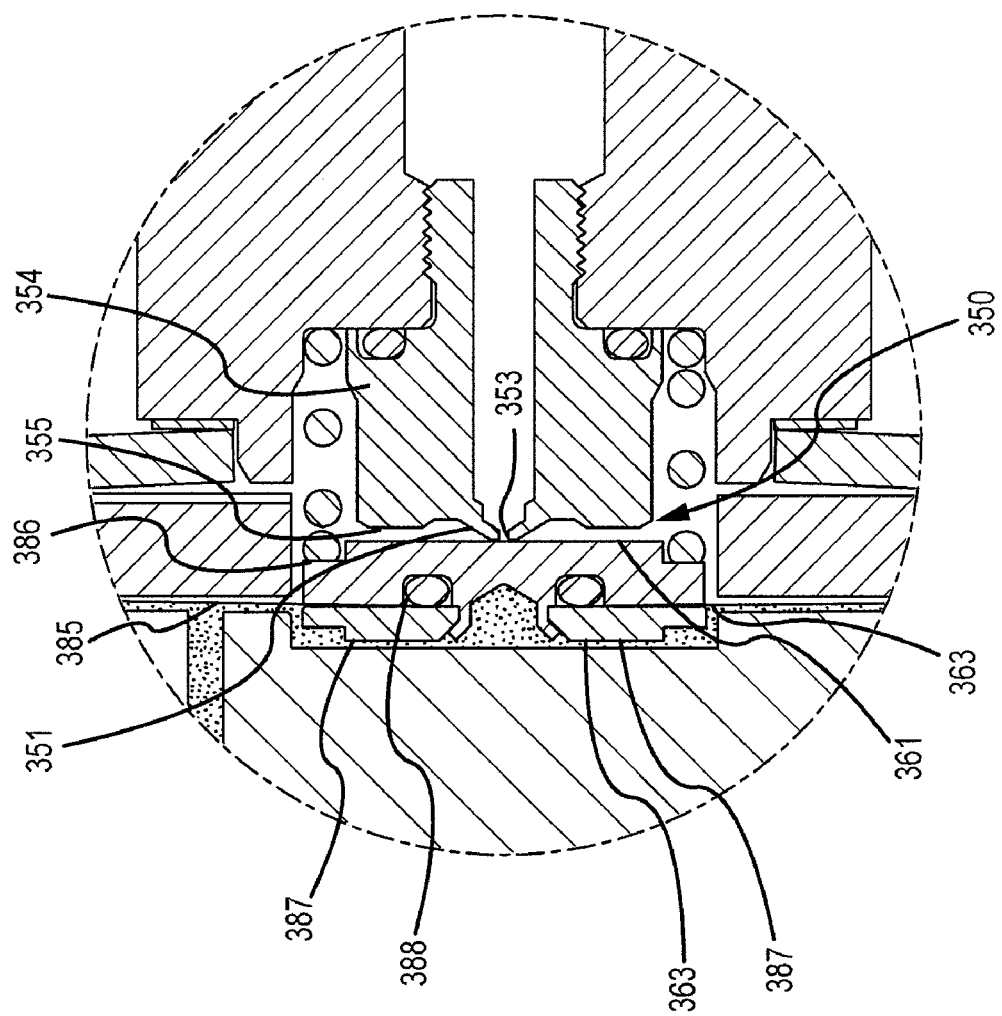
FIG. 8 is a schematic illustration of the exhaust end of the dual differential pressure regulator of FIG. 4 according to an embodiment of the invention.

Conversely, gas is removed from the test volume 302 through the exhaust end 348 of the regulator 375. The exhaust end 348 of the regulator 375 includes an exhaust seat 354, an exhaust spring 352, and an exhaust assembly 350. The exhaust assembly 350 comprises a thin diaphragm member 385, a hub 386, and a washer 387 and a seal 388. The exhaust diaphragm assembly 350 is similar to the supply diaphragm assembly 324 described above and will not be repeated in the interest of brevity. FIG. 8 provides a close up of the exhaust end 348 of the regulator 375 of FIG. 4. In reference to both FIGS. 4 and 8, the exhaust seat 354 has center sealing surface 351 comprising an opening 353 in the exhaust seat 354 that allows gas to exit the regulator to the exhaust port 340. A seal is created when the center sealing surface 351 comes in contact with a first surface 361 of the exhaust diaphragm assembly 350. This seal prevents the gas from exiting the regulator 375.

Figure 9:
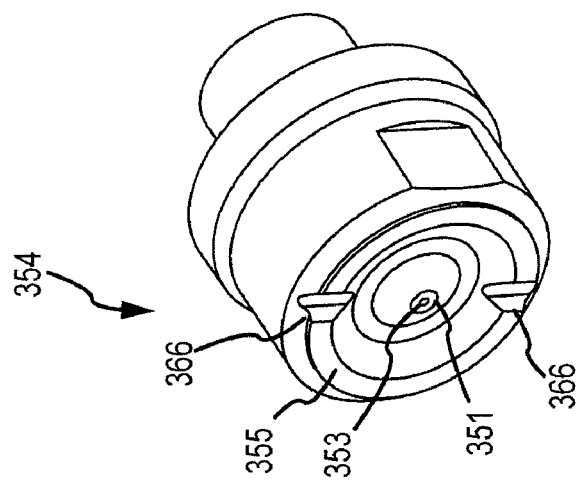
FIG. 9 is a 3-D view of the exhaust seat on the exhaust end of the dual differential pressure regulator of FIG. 8.

The exhaust seat 354 opens and closes in a similar manner to the supply seat 322. For instance, when the regulator 375 is not pressurized, the exhaust seat 354 is open under the effect of the force applied to the first surface 361 of the exhaust diaphragm assembly 350 by the exhaust spring. 352. When the regulator 375 is pressurized, the exhaust seat 354 is nearly closed with a leakage nominally equal to the bypass flow. At this point the exhaust diaphragm assembly 350 is in equilibrium. The exhaust spring 352 force is generally equal to the exhaust differential pressure across the exhaust diaphragm assembly 350 times the area of the exhaust diaphragm assembly. When the exhaust diaphragm assembly 350 is no longer in equilibrium, the exhaust spring 352 force opens the exhaust seat 354 until the exhaust diaphragm assembly 350 reaches equilibrium again. When the exhaust diaphragm assembly 350 is in equilibrium again, the exhaust spring 352 is compressed by the exhaust diaphragm assembly 350 and the exhaust seat 354 closes. FIG. 9 is a 3-D view of the exhaust seat on the exhaust end of the dual differential pressure regulator of FIG. 8. Notches 366 in the outer ring 355 are provided to allow gas to flow out of the exhaust end 348 of the regulator.

In one embodiment, the exhaust seat 354 comprises an outer ring 355 to protect the center sealing surface 351 of the exhaust seat 354 when the exhaust diaphragm assembly 350 is forced against seat 354 due to an abnormal pressure condition. The outer ring 355 is above the main surface of the exhaust seat 354, but below the center sealing surface 351 so that when the center sealing surface 351 of the exhaust seat 354 compresses slightly, the outer ring 355 comes in contact with the first surface 361 of the exhaust diaphragm assembly 350. This protects the center sealing surface 351 from being deformed beyond its elastic limit. In one embodiment, the outer ring 355 is about 10 μm below the center sealing surface 351.

In this embodiment and in prior art, the back faces 333, 363 of the diaphragms 324, 350 are exposed to the reference pressure. As such, leaks around the edges of the diaphragms directly affect reference pressure stability. In the prior art, the differential pressure across the seal at the edge of the diaphragm is the difference between the reference pressure and atmospheric pressure. In this embodiment, no portion of either diaphragm is exposed to atmosphere, and the seals at the edges of the diaphragms must only hold back either the inlet or outlet differential pressure. Since the inlet or outlet differential pressures are small when compared to the difference between the reference pressure and atmospheric pressure, it is easier to assure a stable reference pressure with this design. A further improvement to this design is the use of o-rings 334 and 364 to achieve the seal instead of simply clamping thin diaphragm members like a gasket as is typical in prior art.

To assist in maintaining compression of seals 334 and 364, conical spring washers 328 apply a force on diaphragm plates 332 and 362 which applies a force on the outer perimeter of the supply and exhaust thin diaphragm members 380 and 385. More particularly, when the test volume is pressurized, forces inside the dual regulator push outward on the inlet and outlet bodies, 338 and 368. As a result, the entire housing 375 stretches. When the assembly stretches, conical spring washers 328 expand, maintaining inward force on diaphragm plates 332 and 362, which in turn presses inward on thin diaphragm members 380 and 385, which compress seals 334 and 364, thereby assuring reliable seals are maintained even when housing 375 stretches.

Additional paths for leaks are from the supply end 318 of the regulator 375 to atmosphere and/or the exhaust end 348 of the regulator 375 to atmosphere. A separate seal 330 on the supply body 338 of the regulator 375 seals the high regulator pressure from atmosphere. Similarly, seal 360 seals the low regulator pressure in the exhaust end 348 from atmosphere. By separating the atmospheric seals from the reference seals it is easier to avoid leaks to atmosphere and maintain a stable reference pressure even for supply pressures greater than 15 MPa.

As stated above, when the dual reference regulator 375 is pressurized, structural parts may elastically deform and the supply body 338 and the exhaust body 368 stretch outwardly. Supply spanner nut 336 and exhaust spanner nut 356 counteract the pressure forces being applied to the bodies 338, 368. As the bodies 338, 368 stretch outward, supply atmosphere o-ring 330 and exhaust atmosphere o-ring 360, respectively, slide in housing 376 and maintain a seal, thus reducing and/or preventing leaks to atmosphere. This is in contrast to the regulator design in FIG. 2. The regulators in FIG. 2 include a diaphragm assembly that is clamped together between two flanges. The two separate flanges are connected together by screws. Compression of the diaphragms caused by the clamping force of the screws is the only protection against leaks to atmosphere, and pressure within the regulators stretches the screws elastically, causing leaks. By separating the atmosphere leakage point and the pressure differential leakage point and providing separate seals to prevent each type of leakage, the dual differential regulator is able to maintain a more stable reference pressure over the prior art regulators.

In the embodiment shown in FIGS. 3 through 9, the volume space surrounding the supply diaphragm assembly 324 and the exhaust diaphragm assembly 350 is less than the space in single reference regulators, such as the ones shown in FIG. 2. In particular, the maximum displacements of the diaphragm assemblies 324, 350 are limited by the housing 375 and diaphragm plates 332 and 362 preventing the maximum stress of the diaphragm assemblies 324, 350 from exceeding their elastic limit. Preventing the diaphragm assemblies 324, 350 from flexing beyond their respective elastic limits prevents permanent deformation and rupture of the diaphragm assemblies in the event differential pressures across them are inadvertently excessive in either direction.

In another embodiment, multiple inlet valves and outlet valves may be included in the pressure controller 300 shown in FIG. 3. This allows for the valves to be utilized at differing conductance. For instance, in one embodiment the dual reference pressure regulator 375 is connected to two separate inlet valves in parallel and two separate outlet valves in parallel. A first inlet valve may be used to provide a coarse adjustment for supplying gas to the test volume and a second inlet valve may be used to provide a fine adjustment for supplying gas to the test volume. Similarly, a first outlet valve provides coarse adjustment for removing gas from the test volume and a second outlet valve provides fine adjustment for removing gas from the test volume.

In one embodiment, the above described features of the dual referenced pressure regulator 375 are applied to a pressure regulator of the prior art. In particular, in reference to FIG. 2 the supply regulator 201 may contain some or all of the features described on the supply end 318 of the dual reference pressure regulator 375 from FIG. 4. For instance, the supply regulator 201 may contain the needle assembly, supply seat, supply diaphragm assembly, and other methods to reduce leakage within the dual reference pressure regulator. Similarly, the exhaust regulator 241 may contain some or all of the features described on the exhaust end 348 of the dual reference pressure regulator.

Although the present invention has been described with reference to the disclosed embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

What is claimed is:

1. A dual differential pressure regulator, comprising:
   a housing;
   a reference port coupled to the housing and operable to receive a reference pressure;
   a supply port coupled to the housing and operable to receive a supply pressure;
   a high port coupled to the housing and operable to provide an output pressure, the high port coupled to a supply valve operable to place the high port in selective fluid communication with the supply port, the output pressure of the high port being a relatively fixed amount greater than the reference pressure;
   an exhaust port coupled to the housing and operable to be connected to an exhaust pressure; and
   a low port coupled to the housing and operable to receive an input pressure, the low port coupled to an exhaust valve operable to place the low port in selective fluid communication with the exhaust port, the input pressure of the low port being a relatively fixed amount less than the reference pressure.

2. The dual differential pressure regulator of claim 1 wherein the supply valve comprises:
   a diaphragm assembly having a first surface and a second surface;
   a needle assembly comprising a pin having a first longitudinal length and a ball at a first end of the pin;
   a seat having an edge and an opening, the opening have a second longitudinal length, the pin provided through the seat opening and operable to come in contact with the first surface of the diaphragm assembly, the supply valve being closed when the ball of the needle assembly is in contact with the edge of the seat.

3. The dual differential pressure regulator of claim 1 wherein the exhaust valve comprises a seat and a diaphragm assembly, a first surface of the seat includes a center surface having an opening for pressure to be provided to the exhaust port, the exhaust valve being closed when the center surface of the seat is in contact with a first surface of the diaphragm assembly and the exhaust valve being open when the center surface of the seat is not in contact with the first surface of the diaphragm assembly.

4. The dual differential pressure regulator of claim 3 wherein the first surface of the seat further comprises a raised area operable to be in contact with the first surface of the diaphragm assembly, the raised area being in contact with the first surface of the diaphragm assembly to prevent damage to the center surface of the seat.

5. The dual differential pressure regulator of claim 4 wherein the raised area on the first surface of the seat is a ring around the opening of the seat that is below the center surface and wherein the seat further comprises at least one notch to bleed gas to the exhaust port.

6. The dual differential pressure regulator of claim 1 wherein the output pressure is a fixed amount greater than the reference pressure and the input pressure is a fixed amount less than the reference pressure.

7. A pressure regulator, comprising:
   a housing having a supply portion, reference portion, and an exhaust portion;
   the supply portion having a supply port operable to receive a supply pressure, the supply port coupled to a supply valve, the supply valve coupled to an outlet port, the outlet port operable to provide a first pressure to a test volume;
   the exhaust portion having an exhaust port operable to output an exhaust pressure, the exhaust port coupled to an exhaust valve, the exhaust valve coupled to an inlet port, the inlet port operable to receive a second pressure from the test volume;
   the reference portion having a reference port operable to receive a reference pressure from the test volume; and
   the first pressure being higher than the reference pressure and the reference pressure being higher than the second pressure.

8. The pressure regulator of claim 7 comprising a supply diaphragm assembly having a first surface coupled to a needle assembly, a second surface opposite the first surface, and a body that separates the supply portion of the housing from the reference portion of the housing and an exhaust diaphragm assembly having a first surface coupled to an exhaust seat, a second surface opposite the first surface, and a body that separates the exhaust port of the housing from the reference portion.

9. The pressure regulator of claim 8 wherein a resilient seal is provided between an outer circumference of the second surface of the supply diaphragm assembly and the reference portion of the housing providing a seal to maintain the reference pressure.

10. The pressure regulator of claim 9 wherein a force is applied to the outer circumference of the first surface of the supply diaphragm assembly to reduce pressure leaks due to pressure within the housing.

11. The pressure regulator of claim 8 wherein a resilient seal is provided between outer circumference of the second surface of the exhaust diaphragm assembly and the reference portion of the housing providing a seal to maintain the reference pressure.

12. The pressure regulator of claim 11 wherein a force is applied to the outer circumference of the first surface of the exhaust diaphragm assembly to reduce pressure leaks due to pressure within the housing.

13. The pressure regulator of claim 7 wherein a resilient seal is provided between the reference portion of the housing and the supply portion of the housing that provide a path to atmosphere, and a resilient seal is provided between the reference portion of the housing and the exhaust portion of the housing that provide a path to atmosphere.

14. The pressure regulator of claim 13 wherein the resilient seal create a seal and reduce pressure leaks to atmosphere.

15. The pressure regulator of claim 7 further comprising a supply diaphragm assembly having a member that separates the supply portion of the housing from the reference portion of the housing, the member having a first surface in communication with the first pressure and a second surface in communication with the reference pressure.

16. The pressure regulator of claim 15 further comprising a spring coupled to the second surface of the supply diaphragm assembly member, the spring rate being function of a maximum pressure range of the pressure regulator.

17. The pressure regulator of claim 7 further comprising an exhaust diaphragm assembly having a member that separates the exhaust portion of the housing from the reference portion of the housing, the member having a first surface in communication with the second pressure and a second surface in communication with the reference pressure.

18. The pressure regulator of claim 17 further comprising a spring coupled to the first surface of the exhaust diaphragm assembly member, the spring rate being function of a maximum pressure range of the pressure regulator.

19. A pressure controller and calibrator, comprising:

a test volume having a test port, an inlet port, an outlet port and a feedback port, the feedback port of the test volume being in fluid communication with a reference port of a regulator;

an inlet valve in fluid communication with the inlet port of the test volume and a high port of the regulator;

an outlet valve in fluid communication with the outlet of the port of the test volume and a low port of the regulator; and the regulator, comprising:

a housing having a supply portion, reference portion, and an exhaust portion;

the supply portion having a supply port operable to receive a supply pressure, the supply port coupled to a supply valve, the supply valve coupled to a high port, the high port operable to provide a first pressure;

the exhaust portion having an exhaust port operable to exhaust an exhaust pressure, the exhaust port coupled to an exhaust valve, the exhaust valve coupled to an low port, the low port operable to receive a second pressure;

the reference portion having a reference port operable to receive a reference pressure from a test volume, the first pressure being a relatively fixed amount greater than the reference pressure and the second pressure being a relatively fixed amount less than the reference pressure; and a bypass path operable to remove excess pressure from the supply portion of the housing and provide it to the exhaust portion of the housing.

20. The pressure controller and calibrator of claim 19 comprising multiple inlet valves in fluid communication with the inlet port of the test volume and the high port of the regulator, the multiple inlet valves being in parallel.

21. The pressure controller and calibrator of claim 19 comprising multiple outlet valves in fluid communication with the outlet port of the test volume and the low port of the regulator, the multiple outlet valves being in parallel.

22. The pressure controller and calibrator of claim 21 wherein a first inlet valve and a second inlet valve are in fluid communication with the inlet port of the test volume and the high port of the regulator, the first inlet valve providing coarse adjustment to the reference pressure and the second inlet valve providing fine adjustment to the reference pressure.

23. The pressure controller and calibrator of claim 19 wherein a first outlet valve and a second outlet supply valve are in fluid communication with the outlet port of the test volume and the low port of the regulator, the first outlet valve providing coarse adjustment to the reference pressure and the second outlet valve providing fine adjustment to the reference pressure.

* * * * *